(12) United States Patent
Richards

(10) Patent No.: US 7,891,163 B2
(45) Date of Patent: Feb. 22, 2011

(54) ENGINE

(75) Inventor: Martyn Richards, Burton on Trent (GB)

(73) Assignee: Rolls-Royce plc, London (GB)

( * ) Notice: Subject to any disclaimer, the term of this patent is extended or adjusted under 35 U.S.C. 154(b) by 853 days.

(21) Appl. No.: 11/896,703

(22) Filed: Sep. 5, 2007

(65) Prior Publication Data

US 2008/0253881 A1 Oct. 16, 2008

(30) Foreign Application Priority Data

Sep. 9, 2006 (GB) ................................ 0617769.5

(51) Int. Cl.
*F02G 3/00* (2006.01)
(52) U.S. Cl. .................... 60/39.092; 60/226.1
(58) Field of Classification Search .............. 60/39.091, 60/39.092, 266.1, 244, 785; 55/306; 244/53 B; 415/121.1, 121.2
See application file for complete search history.

(56) References Cited

U.S. PATENT DOCUMENTS

| | | | | |
|---|---|---|---|---|
| 3,338,049 | A | * | 8/1967 | Fernberger ................ 60/39.092 |
| 3,363,419 | A | * | 1/1968 | Wilde ......................... 60/226.1 |
| 3,436,910 | A | * | 4/1969 | Haworth .................. 60/39.092 |
| 3,832,086 | A | * | 8/1974 | Hull et al. ................. 415/121.2 |
| 3,979,903 | A | | 9/1976 | Hull, Jr. et al. |
| 4,183,210 | A | * | 1/1980 | Snell ............................ 60/204 |
| 4,250,703 | A | * | 2/1981 | Norris et al. .............. 60/39.092 |
| 4,261,168 | A | | 4/1981 | Grigorian et al. |
| 4,463,552 | A | | 8/1984 | Monhardt et al. |
| 4,702,071 | A | * | 10/1987 | Jenkins et al. ........... 60/39.092 |
| 4,765,135 | A | * | 8/1988 | Lardellier .................. 60/226.2 |
| 4,864,820 | A | * | 9/1989 | Wynosky et al. ........... 60/226.1 |
| 4,881,367 | A | * | 11/1989 | Flatman ........................ 60/785 |
| 5,123,240 | A | * | 6/1992 | Frost et al. .................... 60/779 |
| 6,319,304 | B1 | | 11/2001 | Moredock |
| 6,499,285 | B1 | | 12/2002 | Snyder |

FOREIGN PATENT DOCUMENTS

EP 1 426 588 A1 6/2002
JP A 2002-242699 8/2002

* cited by examiner

*Primary Examiner*—Michael Cuff
*Assistant Examiner*—Phutthiwat Wongwian
(74) *Attorney, Agent, or Firm*—Oliff & Berridge, plc

(57) ABSTRACT

In prop fan and contra fan gas turbine engines particularly utilized with regard to pusher configurations towards the aft of an aircraft, there is a significant problem with regard to debris and bird strikes resulting in particulate matter which may damage the engine thrust core. By providing an inlet rotor which fragments and creates a centrifugal aspect to the inlet flow, particulate matter can be directed to a bypass chute normally in the form of an annular section extending into a number of chute exits. In such circumstances, the particulate matter is removed continuously from the inlet flow and the chutes are normally angled to project any particulate matter towards propellers of the engine at robust positions.

19 Claims, 4 Drawing Sheets

ENGINE

BACKGROUND

1. Field of the Invention

The present invention relates to an engine and more particularly to gas turbine engines in which the gas turbine drives a shaft on which a propeller or unducted fan is provided for propulsion.

2. Description of Related Art

Operation of gas turbine engines is well known. In some situations it is preferable to couple the propulsion power of that gas turbine engine through a shaft to drive an unducted fan, open rotor or prop for propulsion. These engine configurations are referred to as propfans or contra-rotating fans and utilise a relatively low specific thrust engine. It is also known there are advantages with regard to positioning such propfans and contra-rotating fans towards the rear of an aircraft in a pusher or aft fan configuration.

A significant problem with these gas turbine engines is ingress of debris and birds as particulate matter which will impinge upon the blades of the compressor stage(s) and subsequent parts of the engine's core machinery with possibly significant impact damage or long term wear problems. It will be understood that one of the principal stages of a gas turbine engine's operation is to draw in or suck air which is compressed and then utilised within the thrust core of that engine in order to generate through combustion power either utilised directly in terms of thrust or, in accordance with aspects of the present invention, in order to drive a shaft upon which a propeller or unducted fan is located. Furthermore, it will be understood that a propeller located rearward will result in the inlet for the thrust core, that is to say the turbine machinery of the engine, being very exposed to debris, bird and other particulate matter.

FIG. 1 illustrates a prior prop fan or open rotor pusher configuration of an engine 1 in accordance with aspects of the present invention. It will be noted that a thrust core 2 comprises a number of compressor and turbine stages which drive a shaft 3 upon which propellers 4, 5 are located. The thrust core 2 has a core inlet 6 through which air is drawn in order to provide propulsion in accordance with known gas turbine operation. As air is drawn in through the inlet 6 it will be appreciated that there is exposure to debris, birds and other particulate matter. It will be understood that the engine 1 must be sufficiently robust to survive typical particulate matter ingress.

One approach to provide particulate debris separation is to a have a curved inlet duct such that the denser hard debris will be separable from the air flow and dumped through an appropriate overboard aperture. However, provision of such a curved inlet duct may not be convenient. Furthermore, some approaches have suggested provision of a plenum chamber within which the particulate matter is collected and then dumped at a convenient time, so avoiding potential problems with respect to loss of performance within the engine. In any event, as indicated, curved ducts do not lend themselves to full annular intakes and are more appropriate to "chin" or bifurcated inlets. It will also be understood that larger particulate matter such as birds would remain substantially intact requiring a fairly large catcher duct for overboard dumping.

Furthermore, proposals such as outlined in U.S. Pat. No. 3,979,903 include use of a booster rotor and a switchable particulate matter dump, but such arrangements are configured such that dump flow is not provided at take off when debris separation will typically be at its greatest necessity. Provision of a switchable dump effectively provides a control bleed flow to help part speed aerodynamic handling of the booster rotor which has a sufficiently high pressure ratio to mitigate for a shortfall in pressure ratio capacity in the high pressure core of the thrust part of the engine. In such circumstances continued bleeding in accordance with the proposals of U.S. Pat. No. 3,979,903 would be too penalising on overall engine operational efficiency.

SUMMARY

In accordance with aspects of the present invention there is provided a gas turbine engine comprising a thrust core surrounded by an engine casing, the engine casing including an inlet for an inlet flow to the thrust core, the inlet having a rotor that in use imparts a centrifugal component to the inlet flow, the engine is characterised in that a bypass chute extends between the inlet and the casing, wherein the centrifugal component urges particulate matter in the inlet flow through the bypass chute rather than the thrust core.

Preferably, the engine comprises a fan or propeller and an exit of the bypass chute is positioned upstream of the fan or propeller.

Preferably, the bypass chute comprises variable geometry to vary the flow area of the bypass chute between a fully open and a fully closed position.

Preferably, the bypass chute has a rotatable wall portion to vary cross sectional flow area.

Preferably, the bypass chute has a variable exit aperture area.

Preferably, the variable exit aperture area is provided by a sliding door.

Preferably, the rotor propels a portion of the inlet flow into the thrust core to provide a boost to core pressure to the thrust core.

Preferably, the boost at least compensates for pressure losses to the bypass chute.

Preferably, the thrust core includes a turbine secured upon a turbine shaft and the turbine shaft drives the rotor.

Preferably, the inlet has a nose cone to facilitate inlet flow to the thrust core and/or the centrifugal component.

Preferably, the bypass chute is annular about the thrust core.

Alternatively, the bypass chute extends to a plurality of exit apertures. Preferably, the exit apertures are symmetrically distributed about the engine casing.

Preferably, the thrust core drives a propeller or fan.

Preferably, the bypass chute is configured to eject particulate matter towards the propeller or fan at radially inner positions upon the propeller or fan.

Preferably, the bypass chute is angled to provide thrust recovery.

Preferably, the bypass chute includes guide vanes to adjust a bypass flow through the bypass chute.

In accordance with another aspect of the present invention there is provided a method of operating a gas turbine engine as described above, the method comprising continuously operating the bypass chute in an open position.

Preferably, the method comprising varying the flow area of the bypass chute dependent on engine operating conditions.

Preferably, the engine undergoing at least a take-off, a cruise, the method comprising reducing the flow area between take-off and cruise.

Preferably, the engine undergoing an approach condition, the method comprising increasing the flow area between cruise and approach.

BRIEF DESCRIPTION OF THE DRAWINGS

Embodiments of an engine in accordance with aspects of the present invention will now be described by way of example and with reference to the accompanying drawings in which:—

DETAILED DESCRIPTION OF THE INVENTION

As indicated above, a problem exists with regard to particulate matter in the form of debris or birds entering an engine utilised to propel an aircraft. Of particular concern with regard to aspects of the present invention is an engine which is of a propfan or contra-rotating fan configuration particularly when located towards the aft of an aircraft where possible impingement by particulate matter is further increased. By aspects of the present invention a robust single stage inlet rotor or mini fan is provided at an inlet to an engine to both boost core pressure and generate a centrifugal aspect in the inlet flow such that through centrifugal forces debris and other particulate matter is forced overboard via a continually flowing bypass passage or chute.

It will be understood that the inlet rotor has principal purposes of achieving particulate matter separation for the inlet flow and providing a pressure rise (typically about 1.15) in the flow through the thrust core, that is to say compressors and turbine stages of a gas turbine engine. In such circumstances, it is the ability of the rotor to reduce debris such as birds in the inlet flow to a level which can be ejected through the bypass exhaust chutes which is of most importance. Thus, the inlet rotor may be robust and optimised for that particulate matter reduction function rather than creating a pressure rise. In this way the mini-fan may have a relatively low frontal area that helps to reduce nacelle drag.

It will be understood that particulate matter of a reduced size such as fragmentation of birds will have advantages with regard to reducing the possibility of secondary damage within the engine.

Figure 6:
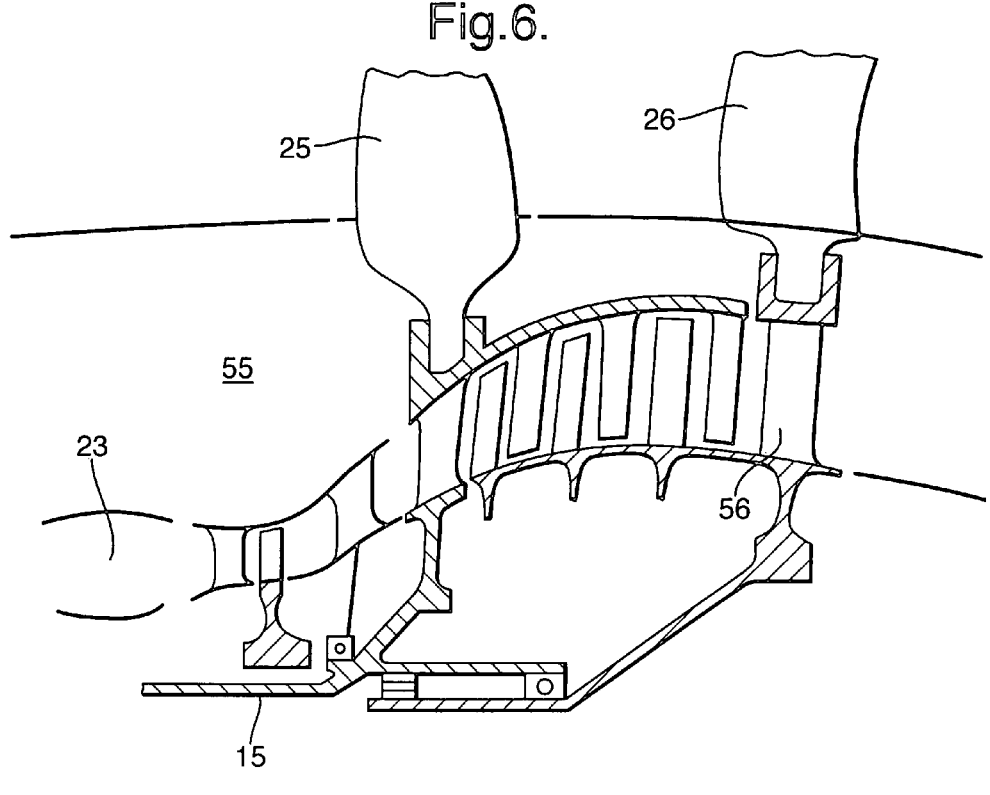

As the objective of an inlet rotor in accordance with aspects of the present invention is to provide debris and particulate matter separation, it will be understood that diameter and spinner geometry (7 in FIG. 2) can be sized to ensure good particulate debris protection whilst providing a modest pressure ratio supplement to the overall pressure ratio without compromising frontal area and nacelle drag. The rotor is therefore typically configured to compensate for the efficiency reduction aspects of particulate matter separation and therefore maintain overall engine performance. Normally, the rotor will be driven by a shaft from the thrust core at relatively high speed thus achieving blade speed for performance and particulate matter separation without a high radius and therefore adverse impact upon frontal area of the inlet. However, it will also be understood that the rotor could be driven by suitable means such as an intermediate pressure turbine (IPT) rather than the power or low pressure turbine (LPT) shown. The suitable means of driving also includes drive from a stage of interleaved and usually contra-rotating turbines 16 as in the case of an unducted fan where the contra-rotating propellers are directly coupled to their part of the turbine 16. FIG. 6 shows this further embodiment where a drive 15 to an inlet rotor 27 is taken from one of the interleaved turbine spools (55 or 56). An interleaved turbine is a multi staged counter rotating power turbine, typically requiring no fixed inter stage stator vanes.

The pressure ratio enhancement provided by a rotor in accordance with aspects of the present invention will generally be relatively modest and in the order of 1.15, but not limited to this, such that continually flowing bypass duct or chute in accordance with aspects of the present invention will be acceptable in terms of thermo dynamic loss and noise particularly if variation in nozzle outlet area is provided for control of flow and exhaust velocities for maximum thrust recovery and minimum noise through the bypass duct.

Aspects of the present invention enable particulate matter separation utilising an annular chute geometry which, as indicated above, may be more convenient for certain engine types including prop fan and contra fans having a low specific thrust engine core. By providing an annular geometry and through appropriate angling of the bypass chute it may be possible to define a passive flow ejector for the bypass flow incorporating the particulate matter debris so that the exhaust vector from the bypass chute will facilitate thrust recovery. It will be understood that hard and smashed particulate matter will be ejected through the bypass chute and therefore that ejected particulate matter will, in a prop fan or contra-rotating fan configuration of an engine, be directed towards a propeller. Again, through appropriate angling of the bypass chutes it will be understood that this particulate matter can be directed towards radial positions 17, preferably radially inwardly, on the propellers which are robust and therefore less susceptible to damage. Note that the propellers are already designed to withstand impacts from foreign objects that have not travelled through the inlet and bypass chute.

It will be understood that sizing of the bypass chute and rotor will be specifically chosen dependent upon engine configuration in order to achieve certain objectives. These objectives may be to have maximum bypass chute flow for inlet rotor handling at low speed and minimised aerodynamic discontinuities in the inlet at higher engine speeds and flow rates when the bypass flow will be relatively small in comparison with the inlet flow to the thrust core of the engine. In a prop fan engine configuration it may be possible to achieve these objectives without providing a bypass chute with variable geometry. This will be achieved by matching the inlet rotor flow performance to the thrust core on the engine at off design so optimising the variable pitch schedule of the propeller blades to adjust the inlet rotor speed. As will be described later, where necessary, the bypass chute can have a variable geometry by utilisation of translating fairings or ramps or flaps to optimise inlet flow stability whilst maximising aerodynamic efficiency and thrust recovery.

Figure 1:
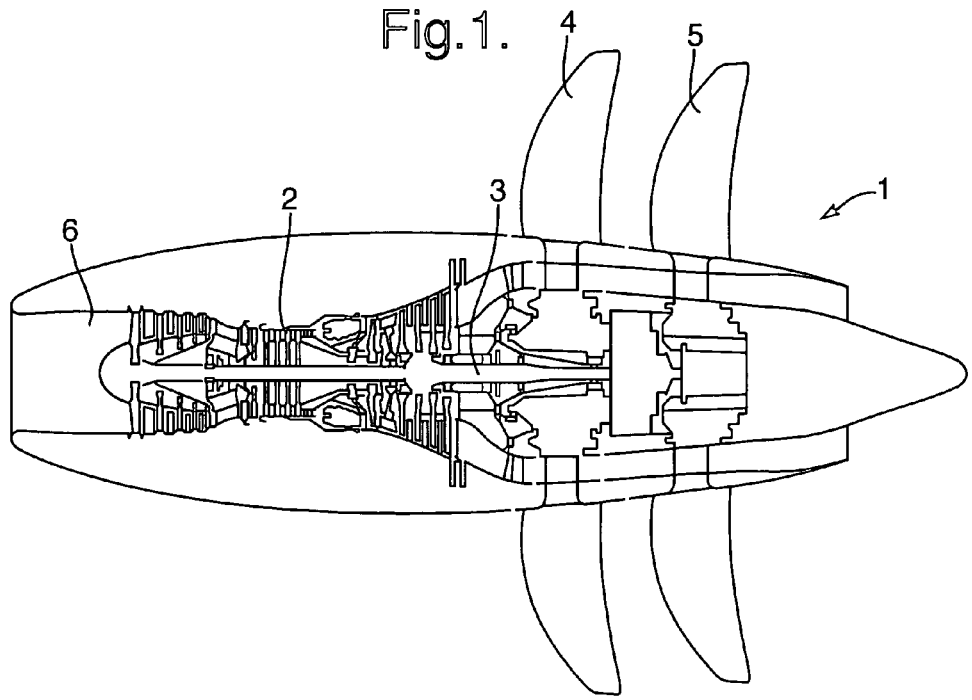
FIG. 1 illustrates a prior prop fan or open rotor pusher configuration.
Figure 2:
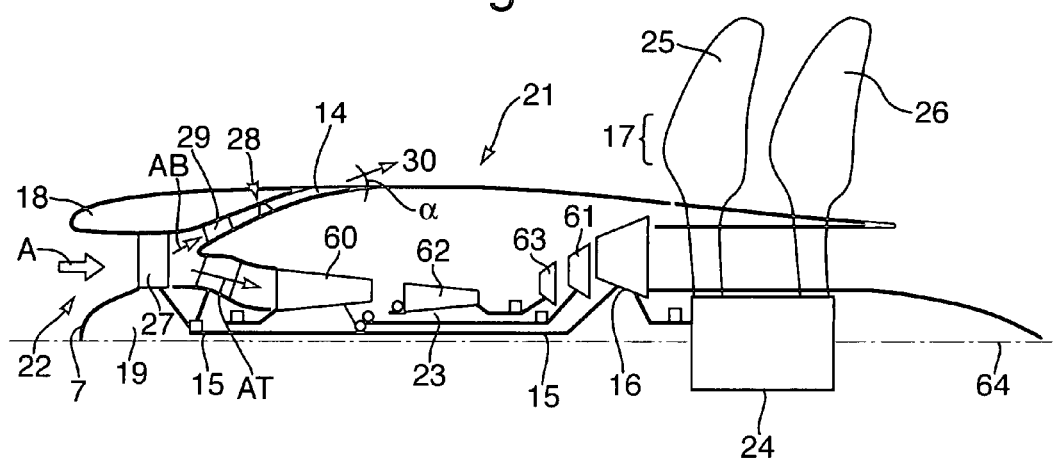
FIG. 2 is a schematic half cross section of an engine in accordance with an embodiment of the present invention.

FIG. 2 provides a schematic half cross section of an engine in accordance with aspects of an exemplary embodiment of the present invention. Thus, the engine 21 comprises an inlet 22 through which air flows to a thrust core 23 comprising a number of compressors 60, 62 and turbine 61, 63, 16 stages secured upon shafts in order to drive propellers 25, 26 through a gearbox 24. The inlet 22 includes an inlet rotor 27 and a bypass chute or passage 28. This passage 28 is annular around the engine 21 and includes guide vanes 29 to appropriately present a bypass chute exhaust flow 30. Alternatively to an annular bypass chute 28, an annular array of discrete bypass chutes 28 may be implemented around the engine.

It will be understood that an inlet flow A may incorporate particulate matter which may cause damage if ingested into the thrust core 23. In such circumstances, the rotor 27 creates a centrifugal component in the inlet flow A. The particulate matter will generally be urged towards a radially outer wall of the inlet 22 between a nose 19 and an engine casing 18. Thus the inlet flow A is split to provide a thrust core flow AT and a bypass flow AB. The bypass flow AB will incorporate at least the larger particulate debris parts.

As indicated above, the inlet rotor 27 has an important function of creating a centrifugal component to the bypass flow AB such that the particulate matter is propelled along the bypass chute or passage 28. The rotor 27 generally rotates at relatively high speed and fragments any larger particulate matter such as birds sufficiently that the reduced size particulate matter can pass along the chute 28.

The guide vanes 29 are configured to straighten the bypass flow AB such that it is propelled in the exhaust flow 30 towards the propellers 25, 26. The angle of the bypass chute 28 directs the exhaust flow, at an angle between the exhaust flow 30 and the engine's rotational axis 64, so that the particulate matter will impact robust parts of the propeller 27 such as the broadest positions 17 on the forward and aft propellers 25, 26.

In this embodiment, the bypass flow AB is continuous to provide handling and ejection of the particulate matter removed from the inlet flow A. Generally, the nose 19 and spinner 7, as well as opposing parts of the engine casing 18, are shaped to optimise aerodynamic presentation to the rotor 17 to optimise particulate matter separation as a result of imparting a centrifugal component of flow.

Although the rotor, as indicated, has an important function with regard to particulate matter separation and fragmentation, it will also be understood that the rotor 27 will act as a supercharger advantageously providing some pressure differential for the flow AT into the thrust core 23 of the engine 21.

As can be seen, a power turbine or LPT 16 of the thrust core 23 has a turbine shaft 15 which, through appropriate couplings, drives the rotor 27.

In the above circumstances it will be appreciated that the inlet flow A is conditioned by the rotor 27 in order to create the centrifugal aspect with regard to the particulate matter in that flow A such that at least the major portion of any particulate matter in the flow A will pass along the bypass chute or passage 28 for exhaustion as flow 30 from an exit to that bypass chute 28. An annular bypass chute passage geometry variability is advantageously defined to give flow control for inlet rotor control as well as optimisation of exhaust 30 air speed for minimum free stream disturbance, low noise and provides an exhaust vector for thrust recovery.

It will be appreciated it is important to balance bypass chute 28 capacity for maximum bypass flow conditions to control inlet stability and to minimise aerodynamic discontinuities in the engine cowl or casing at conditions of the engine 21 where particulate matter ingress is reduced such as at cruise. It will be understood the maximum bypass flow is likely to be on descent where the core spools decelerate rapidly, reducing their swallowing capacity. The inertia of the LP spool is greater and reduces speed more slowly.

Ideally, appropriate sizing of the bypass chute 28 and other configurations within the inlet will be such that it will be possible to avoid a variable geometry to the chute 28. Alternatively, by use of varying propeller pitch it will be possible, as these propellers 25, 26 are also driven by the power turbine 16, to control the rotor 27 speed to match the inlet rotor flow performance to the thrust core 23 of the engine. However, in order to enable full optimisation of propeller 25, 26 speeds for performance and noise it may be necessary to use variable geometry in the chute 28, as described later, to achieve maximum flow and minimise cruise drag balance in the engine 21.

As depicted in FIG. 2 it will be noted that the chute 28 incorporates structural splitters to create exhaust pathways for the flow AB through the chute 28. These splitters will act to define the cross sectional area of the chute 28 annularly about the engine 21. However, at an exit portion 14 of the bypass chute 28, variable geometry may be achieved as described later.

The bleed of flow AB will, in the normal course of events, slightly reduce engine 21 efficiency so that generally the rotor 27 will also be provided to give a pressure ratio boost to the thrust core overall pressure ratio and so improve thermal efficiency. By incorporating a single stage inlet rotor 27 with a modest pressure ratio, the benefit of this passive bleed via the bypass chute 28 is possible without the requirement of an active bleed valve (what for—compressor handling?) for flow control through the engine 21. It will also be understood through use of a prop fan with variable pitch blades and drive from the power turbine 16, handling and flow matching to the thrust core can be achieved via speed control by varying the propeller blade pitch, that is to say load on the power turbine 16.

Although particularly devised with regard to prop fans and contra fans, it will be understood that aspects of the present invention in terms of particulate matter separation through use of a rotor or create a centrifugal aspect is applicable to other engine configurations where the thrust or core turbo machine is exposed to ingested debris or other particulate matter.

Figure 2A:
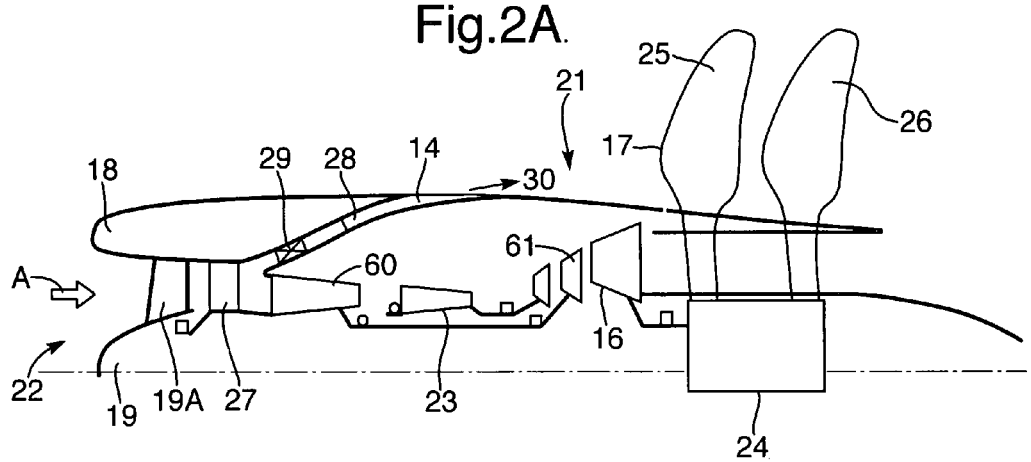
FIG. 2A is a schematic half cross section depicting an alternative to the embodiment depicted in FIG. 2.

FIG. 2A shows an alternative configuration where the inlet rotor 27 is attached and hence driven from the forward most compressor 60 of the thrust core 23. This arrangement preferably has a forward stationary vane 19A to provide structural support for the integral inlet rotor and core compressor and inlet nose 19. In the FIG. 2A arrangement the inlet nose 19 is static. Any debris entering the engine through inlet 22 will be subject to centrifugal effects by rotor 27 and ejected via the chutes 28. Since the drive is via the turbine 61, which is not connected to a propeller rotor 17, it is not possible to vary inlet rotor speed and airflow through the chutes 28 by varying the pitch of propellers 25 and 26.

Figure 2B:
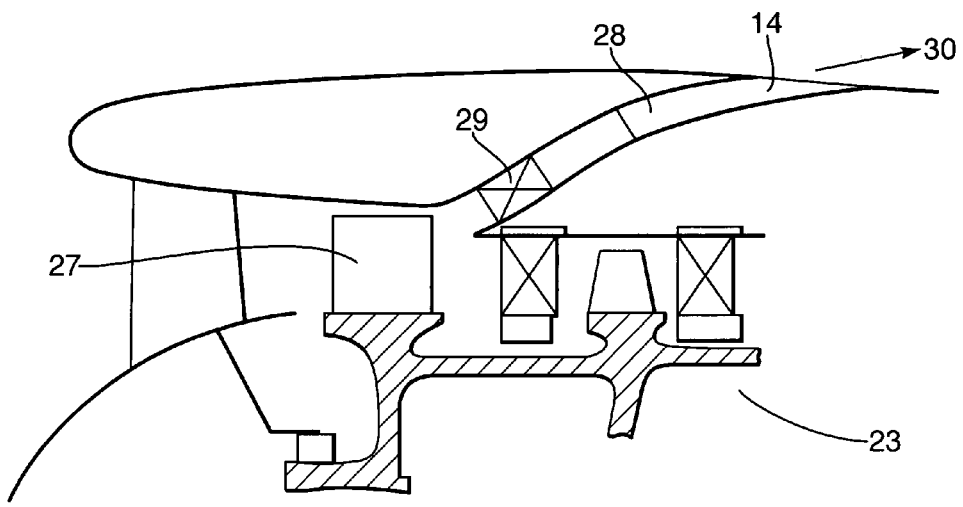
FIG. 2B is a schematic part cross section showing greater detail of an inlet rotor and bypass chute in accordance with aspects of the present invention.

In this case, any adjustment of flow 30 emitting via the ejector chute 28 must be achieved through variable geometry in the chute 28. FIG. 2B shows the detail of the inlet rotor 27 driven from the front of the forward most core compressor 60 and the debris ejector chute 28.

Figure 5:
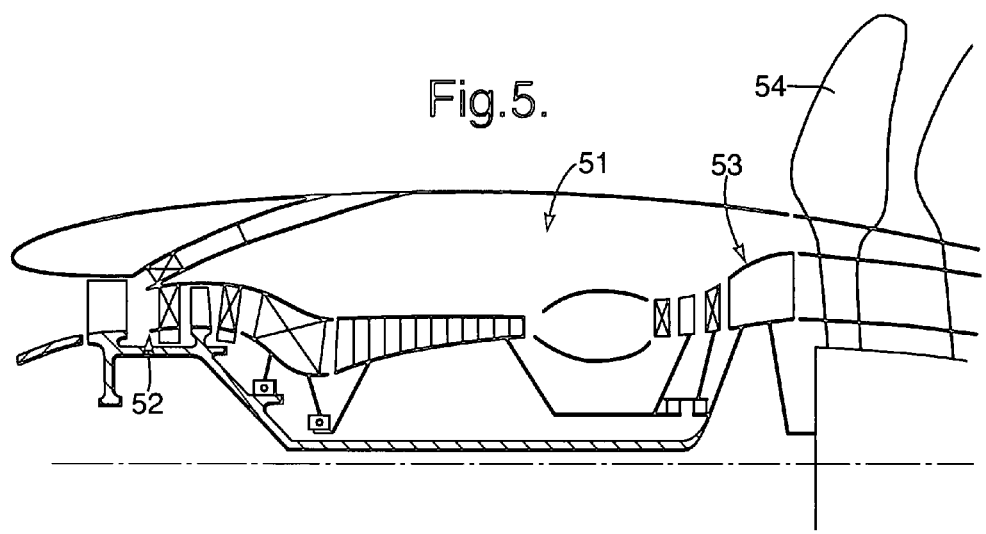
FIG. 5 is a schematic illustration of a part cross section of an engine in accordance with aspects of the present invention having two shafts and super charging; and, FIG. 6 is an illustration of a schematic part cross section of an engine in accordance with another embodiment of aspects of the present invention with an interleaved turbine.

This invention is applicable to multi or single shaft engine configurations. FIG. 5 shows how it can be applied to a single shaft core 51 where supercharging is required through a multi-stage inlet rotor or booster 52 that is driven directly from the power turbine 53 that also drives the propeller rotor 54. Other details of the inlet, rotor and ejector chute are as described previously.

Figure 3:
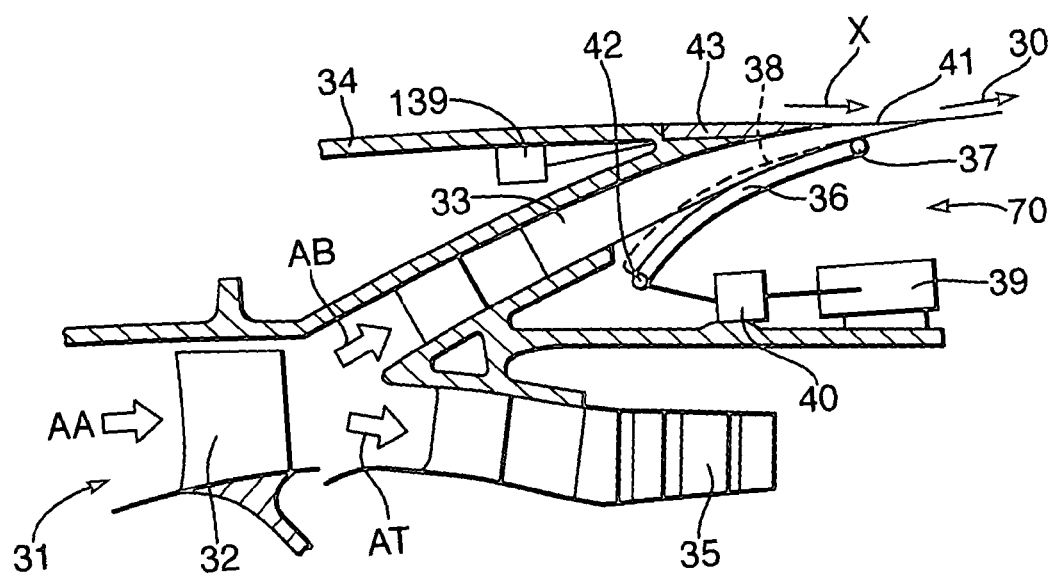
FIG. 3 is a schematic part cross section of an inlet to an engine comprising a debris bypass chute having two embodiments of variable area geometry in accordance with aspects of the present invention.

As indicated above, further refinement to the basis of the inlet rotor and bypass chute in accordance with aspects of the present invention may relate to provisions of variable geometry within the bypass chute and exit for that bypass chute. FIG. 3 provides a part cross section of a bypass chute 33 incorporating two configurations to vary the cross-sectional area of the bypass chute. The two configurations may be either used independently of one another or in combination. It will be apparent to the skilled artisan that other variable geometry will be equally applicable and these configurations are merely exemplary.

As before, an inlet 31 includes an inlet rotor 32 which acts upon an inlet flow AA to generate a centrifugal component and to separate particulate matter in the flow AA into a bypass chute 33. The inlet 31 and bypass chute 33 are all located within an engine casing 34 with the bulk of the inlet flow AA passing along a thrust core 35 to generate propulsion as described previously.

In a first embodiment of the variable geometry 70 depicted in FIG. 3 a bypass chute 33 incorporates a wall portion 36 which is hinged about a pivot 37 to enable variation in the cross sectional area of the bypass chute 33. The wall portion 36 moves inwardly and outwardly to vary the flow area of the chute 33 to an extent dependent upon operational requirements but highlighted by broken line 38 in FIG. 3. Generally, an actuator 39 acts through a unison ring 40 such that, as will be described later, all of the bypass chutes 33 extending to exits 41 have their wall portions 36 deflected equally for symmetry and load distribution about the annulus of the engine.

It is well known that an aircraft and its engines have a number of operating conditions, which are commonly referred to as take-off, climb, cruise and approach or descent. Generally, the engines are at a maximum output at take-off and parts of the climb and output then reduces at cruise to maintain a near constant airspeed. On descent the engines are throttled back and nearer to the airport may be still further reduced in output. Preferably, the bypass chute 33 is continuously flowing at all engine operations although it remains a possibility for certain engines at certain operating conditions for the bypass chute 33 to be completely blocked. Generally, at take-off the chute 33 will operate with a maximum flow area; at climb the flow area will be decreased and further decreased during cruise; and at descent and approach the flow area will be greater than at cruise. Note that for an open-rotor engine climb it is likely that rotational speeds are higher than at take-off, hence maximum chute flow at take-off are not particularly penalising.

It will be noted that the actuator 39 and unison ring 40 act through a junction 42 with the wall portion 36 to cause displacement about the engine Generally, the bypass chute 33 will have a much reduced cross sectional area during aircraft cruising stages with regard to an engine in accordance with aspects of the present invention and therefore dotted line 38 shows the position of the wall 36 in those cruise conditions. At low power levels, for example descent and approach, and usually low altitude, that is to say when particulate matter ingress is most dangerous or probable, the wall portion 36 will be in the position shown by solid line 50. In other circumstances such as cruise, the aerodynamic discontinuity in the casing 34 can be reduced by rotation of the wall portion 36 to address situations where bypass flow is not necessary in order to remove particulate matter before ingress to the thrust core 35 of an engine.

Alternatively, the wall portion 36 may be arranged to pivot about its radially inner end denoted by 42.

In a second embodiment of the variable geometry 70 depicted in FIG. 3, the bypass chute 33 incorporates a slidable door 43 generally located at the exit plane 41. The slidable door 43 slides in the direction of arrowhead X to reduce the exit aperture area dependent on operational circumstances and advantageously minimise the aerodynamic discontinuity of the bypass chute 33. An actuator 139 is connected to the slidable door 43 to enable its operation. The door is movable between a fully open position as shown and a fully closed position.

The slidable door 43 is capable of varying the flow area of the chute 33 in a similar manner to the first embodiment. The slidable or translating door 43 may be either one of a plurality of doors positioned around the engine casing 34 or may be annular or part annular.

Where it is desirable for the bypass chute 33 to be completely closed, debris and particulate matter may build up within the bypass chute 33 and later released by displacement of the wall portion 36 and slide door 43 opened in the opposite direction to arrowhead X.

By use of the rotatable wall portion 36 and/or slide door 43 (or other variable geometry) it will be understood that the opposing requirements of particulate matter removal at low speed with regard to an engine can be balanced and engine operability at various conditions may be advantageously accommodated.

Figure 4:
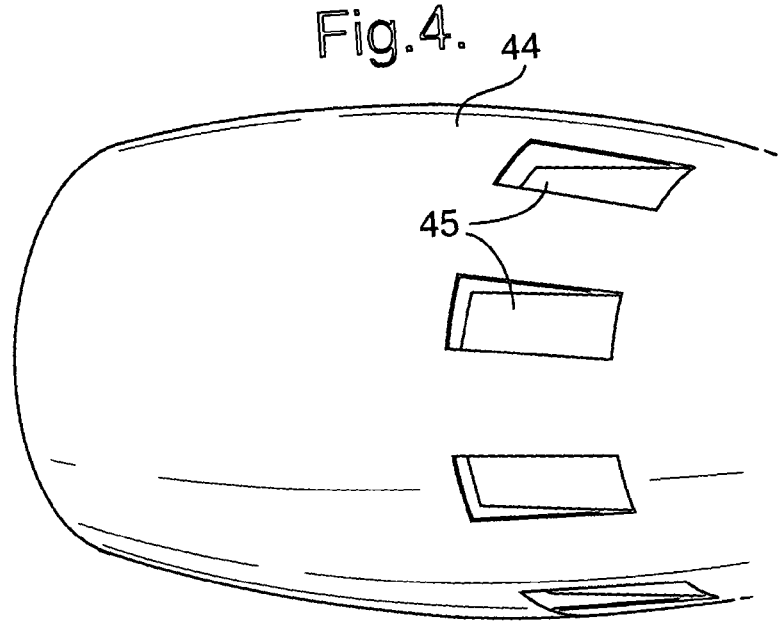
FIG. 4 is a rear perspective view of an engine casing in accordance with aspects of the present invention.

As described previously, generally an annular passage 28, 33 is provided around the engine core which reduces the flow AA as a result of the centrifugal component and propulsion of the inlet rotor 27, 32 as described with regard to FIGS. 2 and 3. It will be understood that provision of an annular outlet exit 41 about the whole circumference of the engine may reduce structural strength within the casing 34. In such circumstances, as depicted in FIG. 4, an engine casing 44 will normally incorporate a plurality of exit chutes 45 typically symmetrically distributed about the engine casing 44 for load balance and particulate matter distribution. In any event, as indicated previously, the chutes 45 will be angled such that presentation of the particulate matter to the propellers is at a position on those propellers of relatively high robustness to ensure minimal damage as a result of that particulate matter hitting the propellers.

The present invention also lends itself to a method of operating the above described gas turbine engines. Although some engines are capable of being operated with a continuously open bypass chute, it is preferable that the flow AB is variable to improve engine operability across its wide range of operating conditions.

Preferably, therefore, the method comprises varying the flow area of the bypass chute dependent on engine operating conditions. Normally, at take-off the engine is at a maximum thrust and the bypass-chute is at or near to a maximum flow area. As the aircraft climbs, the engine thrust is reduced and the flow area is reduced and is further reduced when yet a lower power is required during cruise. Between cruise and approach the flow area of the bypass chute is increased.

The variable geometry can prevent the compressors from surging and allow the core engine to operate at a more uniform rotational speed thereby allowing compressor and turbine blades and stators to be optimised for all engine conditions.

Modifications and alterations to the invention, as described above, will be appreciated by those skilled in the art. Thus, for example, the bypass chutes in accordance with aspects of the present invention may be specifically shaped in order to enhance and promote distribution of particulate matter to the exit portions of the chutes for appropriate distribution. Further, variable geometry may be located at a radially inner part of the bypass chute to vary the flow AB.

In another embodiment of the present invention wherein there is either a plurality of discrete bypass chutes located around the engine or a bypass chute having an annular inlet and discrete outlets or even a bypass chute with discrete inlets and an annular outlet, it is possible to vary the flow AB by blocking off selected discrete inlets or outlets. Where a maximum flow AB is required for engine operability, all inlets or outlets will be open and when this flow needs to be reduced, selected inlets or outlets may be closed. Thus it should be appreciated that the outlets may be designed, with fixed geometry, for thrust recovery in mind rather than comprising variable geometry. Furthermore, this can be advantageous as simple mechanisms to fully open or close the inlets or outlets may be used. Such mechanisms may be more reliable than fully variable geometry.

The invention claimed is:

1. A gas turbine engine comprising an unducted fan or propeller extending radially outward from an engine casing and a thrust core surrounded by the engine casing, the engine casing including an inlet for an inlet flow to the thrust core, the inlet having a rotor that in use imparts a centrifugal component to the inlet flow, wherein downstream of the rotor a bypass chute extends between the inlet and the casing, the centrifugal component urges particulate matter in the inlet flow through the bypass chute rather than the thrust core, and an exit of the bypass chute is positioned upstream of the fan or propeller and is configured for thrust recovery.

2. An engine as claimed in claim 1 wherein the bypass chute comprises variable geometry to vary the flow area of the bypass chute between a fully open and a fully closed position.

3. An engine as claimed in claim 2 wherein the bypass chute has a rotatable wall portion to vary cross sectional flow area.

4. An engine as claimed in claim 2 wherein the bypass chute has a variable exit aperture area.

5. An engine as claimed in claim 4 wherein the variable exit aperture area is provided by a sliding door.

6. An engine as claimed in claim 1 wherein the rotor propels a portion of the inlet flow into the thrust core to provide a boost to core pressure to the thrust core.

7. An engine as claimed in claim 6 wherein the boost at least compensates for pressure losses to the bypass chute.

8. An engine as claimed in claim 1 wherein the thrust core includes a turbine secured upon a turbine shaft and the turbine shaft drives the rotor.

9. An engine as claimed in claim 1 wherein the inlet has a nose cone to facilitate inlet flow to the thrust core and/or the centrifugal component.

10. An engine as claimed in claim 1 wherein the bypass chute is annular about the thrust core.

11. An engine as claimed in claim 1 wherein the bypass chute extends to a plurality of exit apertures.

12. An engine as claimed in claim 11 wherein the exit apertures are symmetrically distributed about the engine casing.

13. An engine as claimed in claim 1 wherein the thrust core drives a propeller or fan.

14. An engine as claimed in claim 13 wherein the bypass chute is configured to eject particulate matter towards the propeller or fan at radially inner positions upon the propeller or fan.

15. An engine as claimed in claim 1 wherein the bypass chute includes guide vanes to adjust a bypass flow through the bypass chute.

16. A method of operating a gas turbine engine as claimed in claim 1, the method comprising continuously operating the bypass chute of the gas turbine engine in an open position.

17. A method of operating a gas turbine engine as claimed in claim 1, the method comprising varying the flow area of the bypass chute dependent on the gas turbine engine operating conditions.

18. A method of operating a gas turbine engine as claimed in claim 17, the engine undergoing at least a take-off, a cruise, the method comprising reducing the flow area between take-off and cruise.

19. A method of operating a gas turbine engine as claimed in claim 17, the engine undergoing an approach condition, the method comprising increasing the flow area between cruise and approach.

* * * * *